(12) United States Patent
Siegrist et al.

(10) Patent No.: US 9,810,920 B2
(45) Date of Patent: Nov. 7, 2017

(54) POSITIONING DEVICE FOR A PICTURE STABILIZER

(71) Applicant: Miniswys SA, Biel (CH)

(72) Inventors: Martin Siegrist, Bern (CH); Jean-Michel Meyer, Sonceboz-Sombeval (CH)

(73) Assignee: MINISWYS SA, Biel (CH)

( * ) Notice: Subject to any disclaimer, the term of this patent is extended or adjusted under 35 U.S.C. 154(b) by 0 days.

(21) Appl. No.: 15/119,787

(22) PCT Filed: Feb. 18, 2015

(86) PCT No.: PCT/CH2015/000020
§ 371 (c)(1),
(2) Date: Aug. 18, 2016

(87) PCT Pub. No.: WO2015/123787
PCT Pub. Date: Aug. 27, 2015

(65) Prior Publication Data
US 2017/0052386 A1 Feb. 23, 2017

(30) Foreign Application Priority Data
Feb. 20, 2014 (CH) ........................................ 231/14

(51) Int. Cl.
*H01L 31/0203* (2014.01)
*G02B 27/64* (2006.01)
(Continued)

(52) U.S. Cl.
CPC ........... *G02B 27/646* (2013.01); *G02B 7/023* (2013.01); *H02K 41/02* (2013.01); *H02N 2/04* (2013.01);
(Continued)

(58) Field of Classification Search
CPC ........... H04N 5/23264; H04N 5/23287; G02B 27/64; G02B 27/646; H01L 31/0203; H01L 31/0232; H01L 31/0236; H01L 31/048
(Continued)

(56) References Cited

U.S. PATENT DOCUMENTS

| 8,648,920 | B2 * | 2/2014 | Terajima | G02B 7/28 348/208.2 |
| 9,036,260 | B2 * | 5/2015 | Sugawara | G02B 7/08 359/557 |

(Continued)

FOREIGN PATENT DOCUMENTS

| EP | 1 795 944 | | 6/2007 | |
| JP | 2011-65140 | * | 3/2011 | ............... G03B 5/00 |
| WO | 2006/000118 | | 1/2006 | |

*Primary Examiner* — Ngoc-Yen Vu
(74) *Attorney, Agent, or Firm* — Rankin, Hill & Clark LLP

(57) ABSTRACT

A positioning device for a picture stabilizer for the controlled movement of a carrier with respect to a base includes a first coupling element, a second coupling element, a first transmission unit, and a second transmission unit. The first coupling element, by way of a first suspension, is assembled in a movable manner with respect to the base and is movable by a first linear drive. The second coupling element, by way of a second suspension, is assembled in a movable manner with respect to the base and is movable by a second linear drive. The first transmission unit transmits movement of the first coupling element onto the carrier and the second transmission unit transmits movement of the second coupling element onto the carrier. The first coupling element and the second coupling element in each case have a movability with essentially exactly one translatory degree of freedom.

21 Claims, 12 Drawing Sheets

(51) Int. Cl.
  *H04N 5/232*    (2006.01)
  *G02B 7/02*     (2006.01)
  *H02K 41/02*    (2006.01)
  *H02N 2/04*     (2006.01)
  *H04N 5/225*    (2006.01)

(52) U.S. Cl.
  CPC ..... *H04N 5/23264* (2013.01); *H04N 5/23287* (2013.01); *G03B 2205/0007* (2013.01); *G03B 2205/0015* (2013.01); *G03B 2205/0023* (2013.01)

(58) Field of Classification Search
  USPC .................................. 348/374; 257/433–434
  See application file for complete search history.

(56) References Cited

U.S. PATENT DOCUMENTS

| | | | |
|---|---|---|---|
| 9,151,964 B2* | 10/2015 | Takei | G02B 27/64 |
| 9,423,628 B2* | 8/2016 | Han | H02K 41/0356 |
| 2006/0227437 A1 | 10/2006 | Makii | |
| 2008/0198462 A1 | 8/2008 | Sekino | |
| 2009/0303595 A1 | 12/2009 | Lim et al. | |
| 2010/0123788 A1 | 5/2010 | Shin | |
| 2012/0229901 A1 | 9/2012 | Moriya et al. | |
| 2016/0306185 A1* | 10/2016 | Hu | G02B 27/646 |
| 2017/0115463 A1* | 4/2017 | Osaka | H04M 1/0264 |

\* cited by examiner

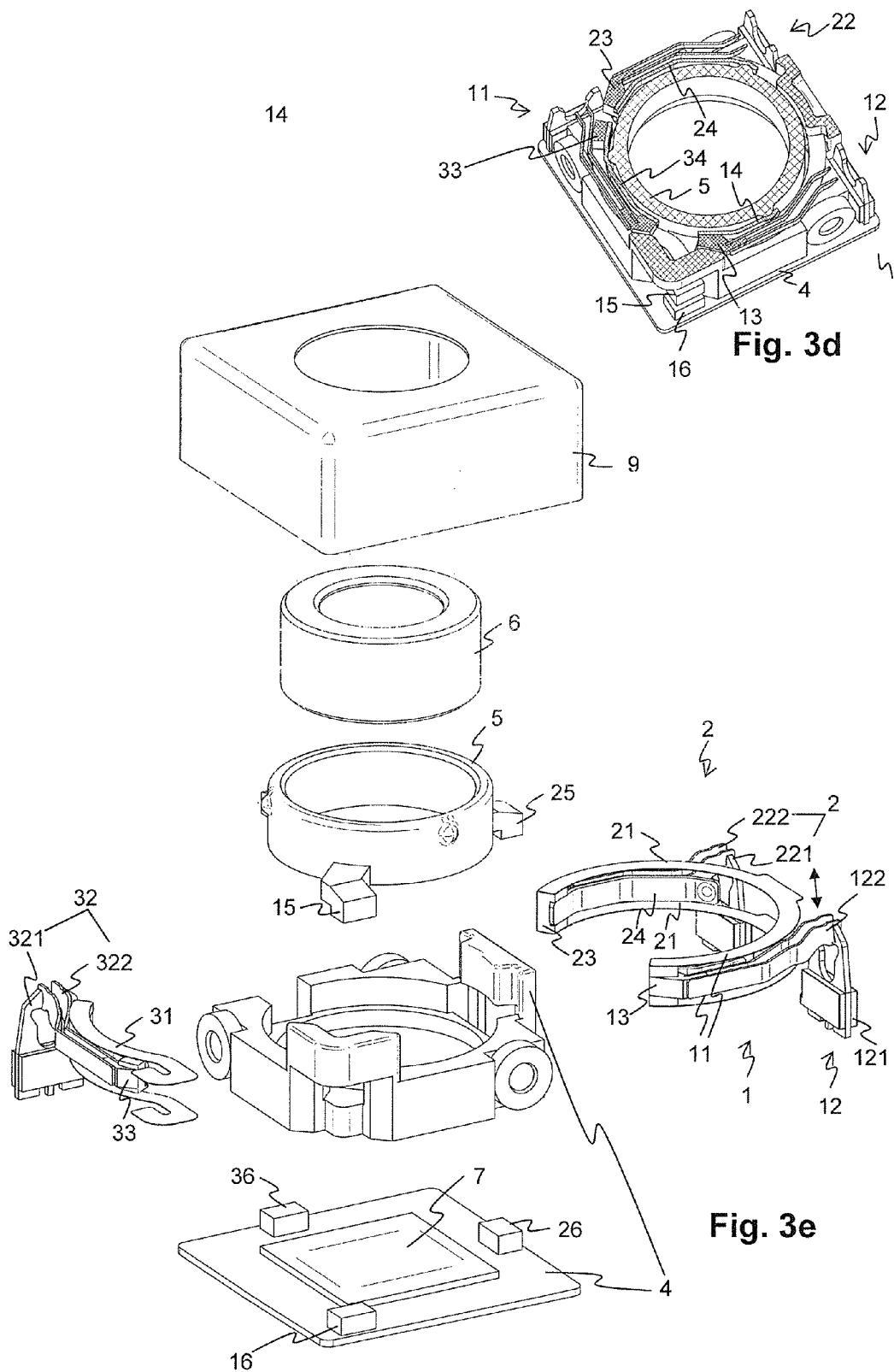

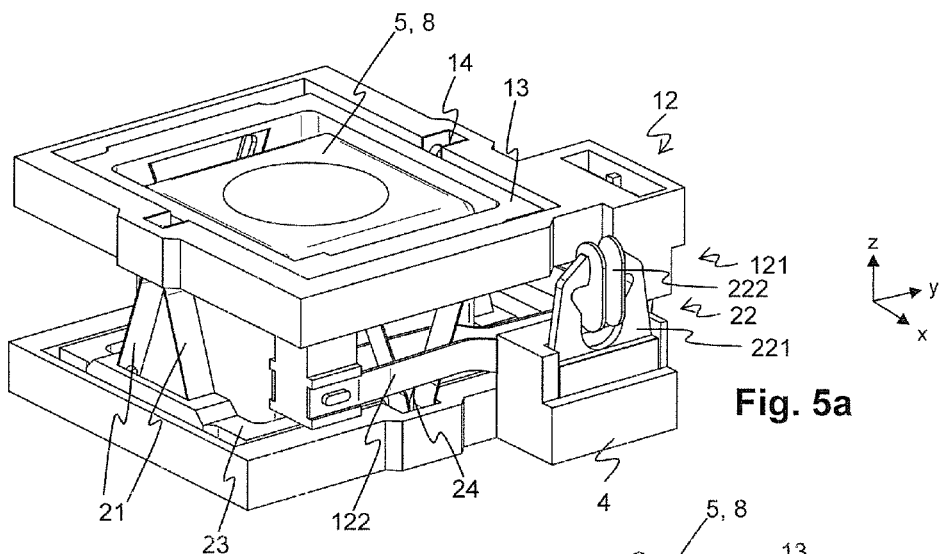
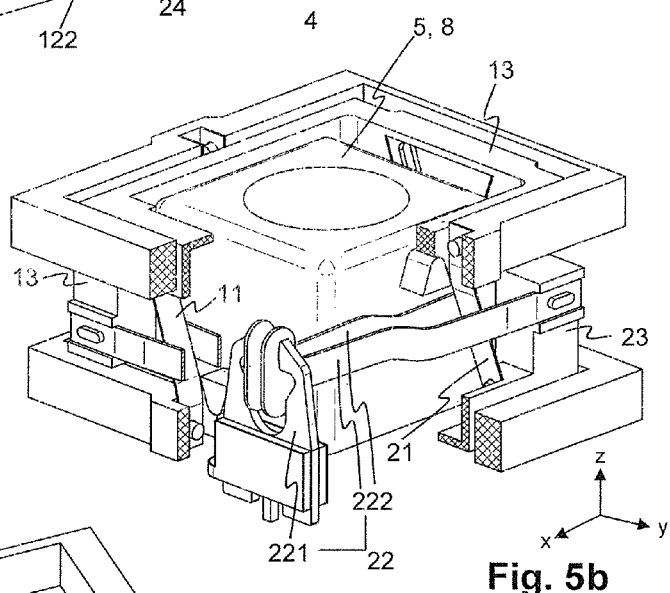
Fig. 5b
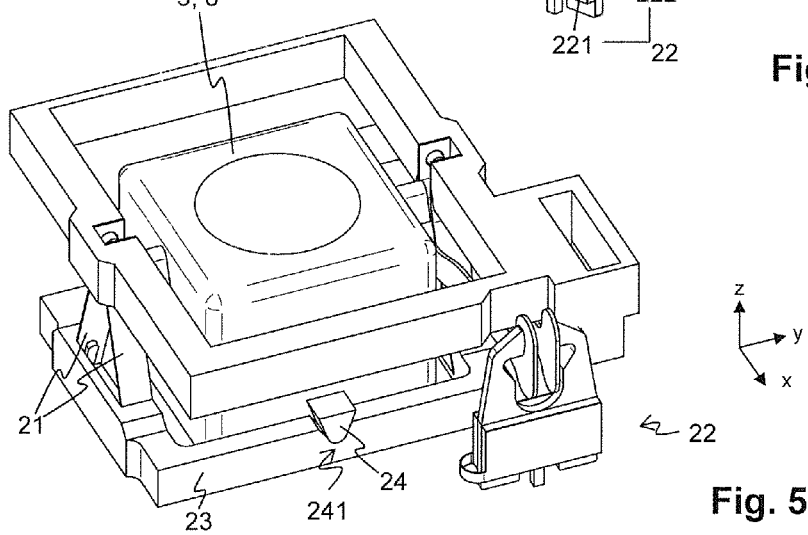
Fig. 5c

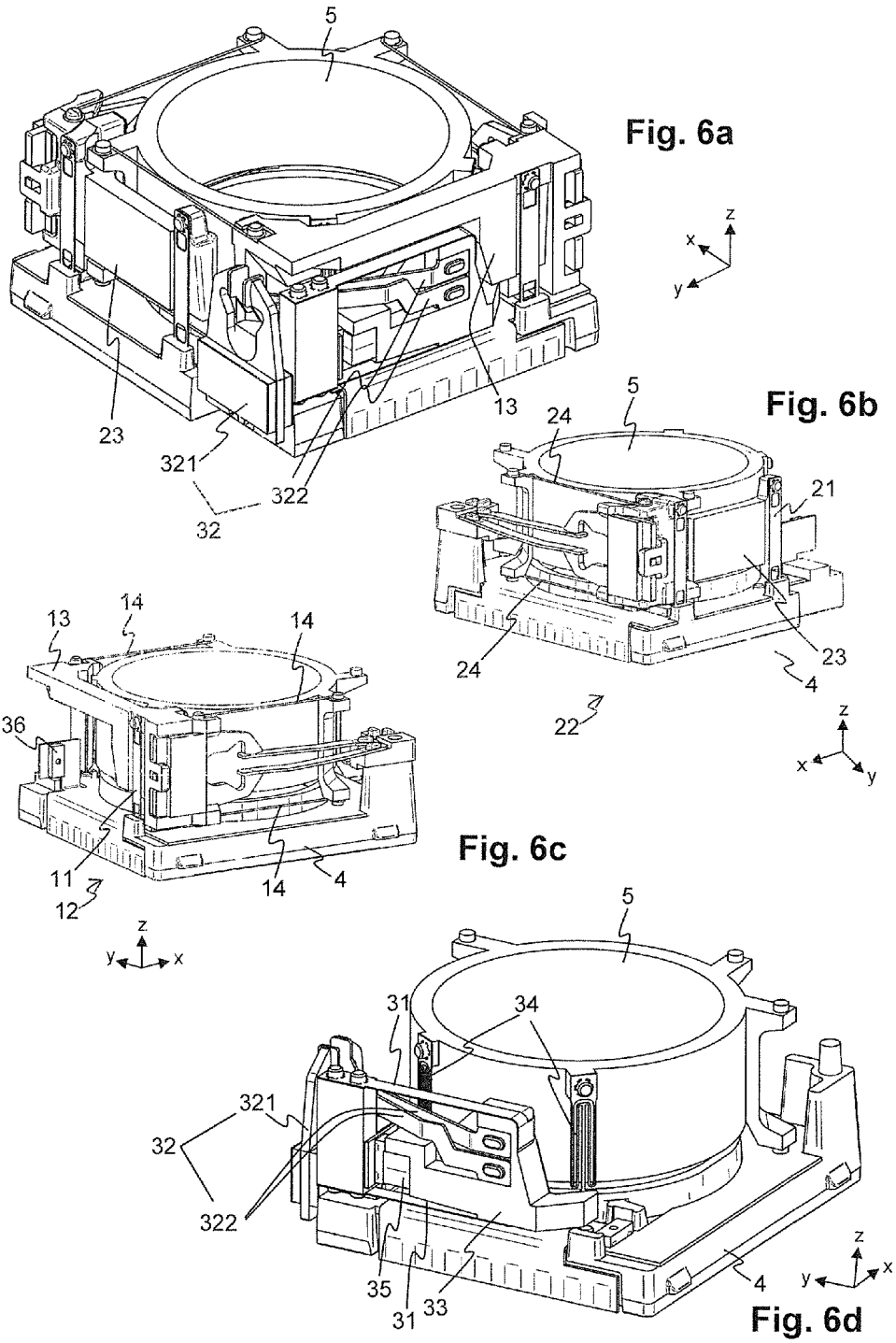

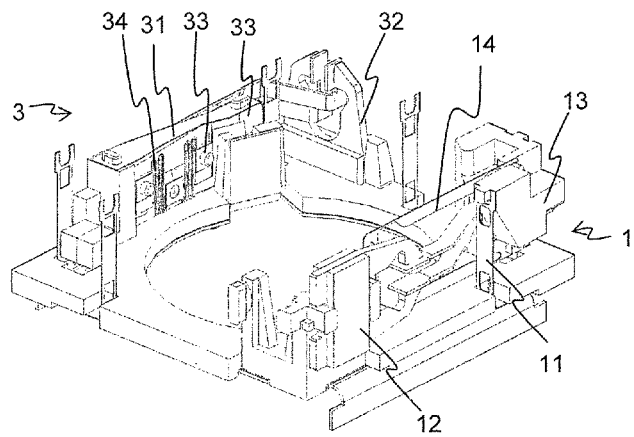
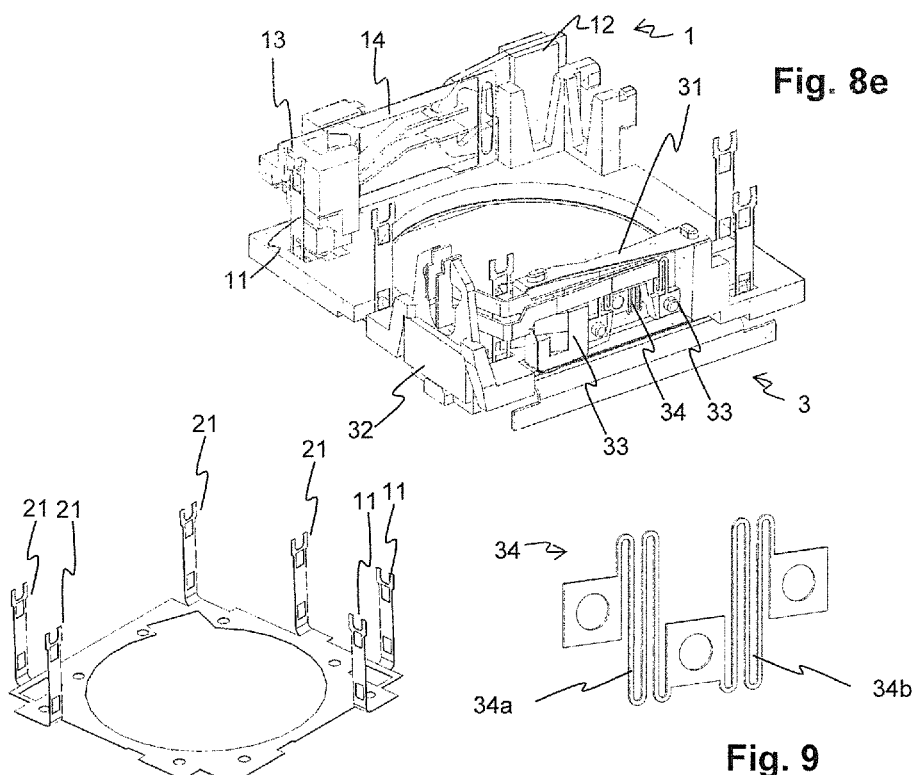
Fig. 8d
Fig. 8e
Fig. 7c
Fig. 9

POSITIONING DEVICE FOR A PICTURE STABILIZER

BACKGROUND OF THE INVENTION

Field of the Invention

The invention relates to the field of micro positioning units and in particular to a positioning device for a picture or image stabiliser.

Description of Related Art

EP 1 795 944 A1 discloses a positioning device for a lens in an optical picture stabiliser, with which a lens holder includes two arms that lead to one another away from the lens at right angles and are provided with permanent magnets. With this and by way of a coil, each of these arms can be displaced in a direction parallel to the optical axis of the lens. The lens holder is assembled on an intermediate element in a rotatable manner about a first axis, and the intermediate element in turn is assembled on a base in a rotatable manner about a second axis that runs normally to the first axis.

US 2008/0198462 shows an optical picture stabiliser, likewise with two drives, in each case with a permanent magnet and a coil, by which means a camera module with a lens and picture sensor can be positioned. The camera module is rotatably suspended about a point, and can be tilted about two axes by way of the drives, which act in a direction parallel to the optical axis and engage on two other points of the camera module.

SUMMARY OF THE INVENTION

It is the object of the invention, to provide a positioning device for a picture stabiliser of the initially mentioned type, which realises an alternative to the known devices.

A further object is to provide a positioning device for a picture stabiliser, which has reduced energy consumption.

A further object is to provide a positioning device for a picture stabiliser, which has a greater mechanical stability.

A further object is to provide a positioning device for a picture stabiliser, which has a greater bandwidth of the picture stabilisation, and thus can compensate higher frequencies of disturbances.

A further object is to provide a positioning device for a picture stabiliser, which offers an alternative to existing devices.

The positioning device for a picture stabiliser for the controlled movement of a carrier with respect to a base includes:
  a first coupling element, which by way of a first suspension is movably assembled with respect to the base and is moveable by a first drive,
  a second coupling element, which by way of a second suspension is movably assembled with respect to the base and is movable by a second drive,
  a first transmission unit, with which a movement of the first coupling element can be transmitted onto the carrier,
  a second transmission unit, with which a movement of the second coupling element can be transmitted onto the carrier,
  wherein the first drive and the second drive are linear drives and the first coupling element and the second coupling element each have a movability with essentially exactly one translatory degree of freedom (with respect to the base).

The suspensions and the transmission units can be realised in a more stable manner and with greater spring constants (thus, with harder springs) than with known positioning devices with an equal number of degrees of freedom, due to the fact that the movements of the drives and of the coupling elements are limited to linear movements. With this, the natural frequencies of the system become greater and, thus, in turn it is possible to compensate movements with higher disturbance frequencies.

In at least one embodiment, at least the first suspension and/or the second suspension are realised by a suspension with at least two flat spring elements that connect the respective coupling element to the base. With this, it is possible to realise a suspension that, in one direction—in particular within a plane of the flat spring element—has a high stiffness, and with movements perpendicular to this plane has a low stiffness. The flat spring elements, for example, are spring leaves.

In at least one embodiment, at least the first drive and the second drive are piezoelectric linear drives, in particular those with which a flat resonator extends with two arms parallel to a plane of an active element, in the manner of a tuning fork. The resonator therein can be brought to oscillate by way of an electrically supplied piezoelement, wherein contact regions of the resonator due to an oscillating movement drive a passive element of the drive with respect to the active element.

Higher drive forces can be mustered due to the application of drives that are developed in such a manner—in contrast to moving coil drives—and this likewise favours the use of harder springs and the already described increase of the natural frequencies.

In at least one embodiment, at least one of the drives includes an active drive part and a passive, driven part. The drive, in particular, is a piezoelectric drive, with which a resonator is set into oscillation by way of an electrically fed piezoelement, wherein contact regions of the resonator due to an oscillating movement drive the passive part of the drive with respect to the drive part. Thus, a very small a precisely controllable suspension can be created. A supply frequency of the piezomotor and thus an oscillation frequency of the resonators and contact regions for example are between 450 and 500 kHz.

The drive part can have a flat shape, by which means the constructional size can be designed very small. Preferably, the passive part is fastened on the carrier element. The extension of the flat drive part in the plane of its greatest extension is preferably at least three to five times larger than in a direction perpendicular to this plane. The positioning device is preferably smaller than 20 mm in each direction, preferably smaller than 10 mm in each direction.

In at least one embodiment, at least one of the drives is constructed as a piezoelectric (linear) drive, with which a flat resonator extends with two arms parallel to the plane of the drive part in the manner of a tuning fork, and the resonator can be set into oscillation by way of an electrically supplied piezoelement, wherein contact regions of the resonator due to an oscillating movement drive the passive part of the drive with respect to the drive part. The passive part thereby does not undergo an exactly linear movement, although the drive part would be suitable for such, but moves on a circular path about the carrier axis.

The flat resonator lies in the plane of the drive part or defines this plane. Preferably, the second drive is also constructed in this manner. Corresponding piezoelectric drives are disclosed in WO 2006/000 118, for example according to the embodiments in the FIGS. 35-40, in particular embodiments with only one drive plate or resonator plate. With this, comparison to pure piezoelements or ones acting via a lever as the case may be, a relatively long deflection of the drive can be realised and thus also a relatively large deflection angle about the first and second axis.

The at least one drive has a holding force also in the non-supplied condition, and thus is self-locking. This is in contrast to moving coil drives, for example, which must be constantly supplied with energy, in order to maintain a certain position. An energy-saving operation can be realised with this.

In at least one embodiment, the first suspension permits a parallel displacement of the coupling element with respect to the base, and the second suspension permits a parallel displacement of the second coupling element with respect to the base.

In at least one embodiment, the first transmission unit permits a parallel displacement of the carrier with respect to the first coupling element, and the second transmission unit permits a parallel displacement of the carrier with respect to the second coupling element.

A movement or relative movement between two bodies, which does not change the orientation of the bodies relative to one another, is indicated as a parallel displacement. It thus has no rotation degrees of freedom (in the practical sense: no significant rotation degrees of freedom). A parallel displacement can permit a translation of the bodies relative to one another along one or two or three directions orthogonal to one another. Thereby, the movement can have one, two or three translation degrees of freedom. For example, parallel displacements can have the following characteristic and be realised as follows:

Translation in only one direction, a one translation degree of freedom: sliding joint. The relative movement realised with this is a parallel displacement with one translation degree of freedom.

Translation in two directions, one translation degree of freedom: parallelogram suspension with rotatory joints. Considered more generally, the rotatory joints are joint locations with one rotation degree of freedom. This type of parallelogram suspension is hereinafter indicated as a parallelogram suspension with one translation degree of freedom. The relative movement realised with this is likewise a parallel displacement with one translation degree of freedom.

Translation in three directions, two translation degrees of freedom: parallelogram suspension with ball joints. Considered more generally, these ball joints are joint locations with two rotation degrees of freedom. This type of parallelogram suspension is hereinafter indicated as a parallelogram suspension with two translation degrees of freedom. The translation relative movement which can be realised with this is a parallel displacement with two translation degrees of freedom. Such a suspension under certain circumstances can also permit a rotation. Such a rotation degree of freedom can be eliminated again in combination with a further suspension. This further suspension forms a kinematic chain parallel to the parallelogram suspension mentioned here.

Instead of rotatory joints, one can also use flat elements for realising joint locations with one rotation degree of freedom. Bending sections of these elements assume the function of a rotatory joint. A bending section or a bending location can be formed by way of a part of the flat element being designed more thinly, or by way of the flat element having an elongate shape and being bendable about an axis, which is transverse or essentially perpendicular to the direction of the greatest extension of the flat element. If the flat element lies in a plane, then this axis runs within this plane.

Instead of ball joints, one can also use elements which in bending sections are bendable in two directions, for realising joint locations with two rotation degrees of freedom. These can be elastic rods or wires. They can consist of plastic or metal or a combination. A bending section can, but does not need to be designed as a tapering of a rod or wire.

In at least one embodiment, one or more of the parallel displacements is realised in each case with a parallelogram suspension. A parallel displacement with one translation degree of freedom is thereby thus realised with a parallelogram, suspension with one translation degree of freedom. A parallel displacement with two translation degrees of freedom is thereby thus realised with a parallelogram suspension with two translation degrees of freedom.

In at least one embodiment, at least the first suspension and/or the second suspension is realised by a parallelogram suspension with at least two flat spring elements that are arranged parallel to one another and connect the respective coupling element to the base.

In at least one embodiment, the parallel displacement of the first coupling element with respect to the base has exactly one translation degree of freedom, and the parallel displacement of the second coupling element with respect to the base has exactly one translation degree of freedom.

In at least one embodiment, the parallel displacement of the carrier with respect to the first coupling element has exactly two translation degrees of freedom, and the parallel displacement of the carrier with respect to the second coupling element has exactly two translation degrees of freedom.

In at least one embodiment, the parallel displacement of the carrier with respect to the first coupling element has exactly one translation degree of freedom, and the parallel displacement of the carrier with respect to the second coupling element has exactly one translation degree of freedom.

In at least one embodiment, the positioning device comprises
 a third coupling element that, by way of a third suspension, is movably assembled with respect to the first coupling element and is movable by a third drive, as well as
 a third transmission unit, with which a movement of the third coupling element can be transmitted onto the carrier.

The third coupling element can be arranged in a recess in the first coupling element. The three drives can in each case be arranged at one of four corners of an essentially rectangular positioning device.

In at least one embodiment, if the carrier is arranged above the base (thus shifted in the Z-direction with respect to the base), the first coupling element and the second coupling element are arranged laterally of the carrier (thus shifted in the X-direction or Y-direction with respect to the carrier).

The first coupling element extends along a first side of the positioning device and executes a movement in the direction normal to this first side. The second coupling element extends along a second side of the positioning device and executes a movement in the direction normal to this second side.

In at least one embodiment, if the carrier is arranged above the base (and thus is shifted in the Z-direction with respect to the base), the first coupling element embraces (encompasses) the carrier at least in sections and is arranged in a lower region of the carrier. The second coupling element in contrast embraces the carrier at least in sections and is arranged in an upper region of the carrier.

In one embodiment, the positioning device includes:
- a third coupling element that, by way of a third suspension, is movably assembled with respect to the base and is movable with a third drive,
- a third transmission unit, with which a movement of the third coupling element can be transmitted onto the carrier,
- wherein each of the three transmission units engages on a periphery of the carrier at a different contact location, and all three transmission units effect an essentially translatory movement of the respective contact location.

In at least one embodiment, the first suspension permits a rotation of the first coupling element with respect to the base, and the second suspension permits a rotation of the second coupling element with respect to the base.

The rotation axes of the two suspensions are thereby different to one another. The rotation axes can be orthogonal to one another, in particular in a projection onto a plane which is normal to the shortest connection of the two rotation axes.

In at least one embodiment, the first transmission unit permits a rotation of the carrier with respect to the first coupling element, and the second transmission unit permits a rotation of the carrier with respect to the second coupling element.

In at least one embodiment, in a reference position of the carrier, it is the case that
- a rotation axis of the first suspension runs parallel to a rotation axis of the second transmission unit or coincides with this rotation axis, and that
- a rotation axis of the second suspension runs parallel to a rotation axis of the first transmission unit or coincides with this rotation axis.

In at least one embodiment, several resilient elements of one of the suspensions, is formed in a single-piece manner as sections of an initially flat part. In at least one embodiment, several resilient elements are formed by different ones of the suspensions, in a single-piece manner as sections of an initially flat part. In at least one embodiment, several resilient elements of at least one of the suspensions and of at least one of the transmission units are formed in a single-piece manner as sections of an initially flat part. A simplification of the manufacture is possible with one or more of these combinations of resilient elements into a single-piece part.

In at least one embodiment, the carrier carries a lens holder with an optical lens system and carries the base of an optical sensor or picture sensor. An (optical) picture stabiliser can be realised with this.

In at least one embodiment, the mounting device includes a micro camera module that is arranged in the carrier, thus a unit with a lens system as well as with an optical sensor, which are moved with one another by the positioning device. Thereby, the micro camera module or a housing or holder of the micro camera module itself can form the carrier. An (optical) picture stabiliser can also be realised with this.

The micro camera module itself or the lens holder can also include one or more motors, in order for example to set the sharpness and/or a zoom setting. One can use those drives that are described here and in the already cited WO 2006/000 118, or drives formed in a different manner, for example electromagnetic actuators such as moving coil actuators or voice coil actuators.

In some embodiments, active elements of the drives are assembled on the base, and passive elements on parts, which are moved with respect to the base. In other embodiments—depending on the spatial conditions, and for the reduction of the spatial requirement—conversely, the active element is also assembled on a moved part and the passive element on the base. In the same embodiment, with one drive the active element can be assembled on the base and with another drive the active element assembled on a moved part.

In the previous examples, the suspensions are each arranged between the base and the coupling elements, and the transmission units in each case between the coupling elements and the carrier. The sequence can, however, also be the other way round, thus that the transmission units are in each case arranged between the base and the coupling elements, and the (driven) suspensions arranged in each case between the coupling elements and the carrier. Expressed differently, thus the base and the carrier can exchange their roles: the parts indicted as a carrier can serve as a base, and the parts indicated as a base can serve as a carrier.

If, in the present document, one speaks of a suspension or a transmission unit having a certain number of degrees of freedom, then this, if it is realised by resilient elements, can mean that a spring constant with respect to a movement in the dimension or dimensions corresponding to the degrees of freedom (thus those in which the suspension or transmission unit is compliant) is at least five or ten or twenty or fifty or hundred times smaller than in the other (orthogonal) dimensions (thus those, in which the suspension or transmission unit is rigid).

BRIEF DESCRIPTION OF THE DRAWINGS

The subject-matter of the invention is hereinafter explained in more detail by way of preferred embodiment examples, which are represented in the accompanying drawings. In each case are shown, partly schematically:

FIG. 3a-3e an embodiment with a carrier that is rotatable about two rotation axes and is movable in one translatory direction:

FIGS. 5a-5d an embodiment with a carrier that is rotatable about two rotation axes;

FIGS. 6a-6d a variant of the embodiment of FIGS. 1a-1h;

FIGS. 7a-7c in each case, several spring elements, which are designed as sections of a single-piece part;

FIGS. 8a-8e a further variant of the embodiment of FIGS. 1a-1h; and

FIG. 9 two spring elements on a single-piece part.

DETAILED DESCRIPTION OF THE INVENTION

Figure 1A:
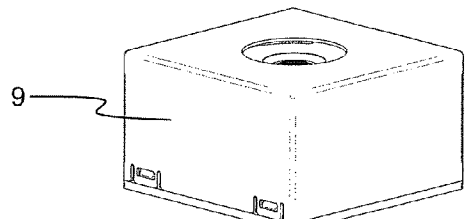
FIGS. 1a-1h an embodiment with a carrier movable in three translatory directions.

Basically, the same or equally acting parts are provided with the same reference numerals in the figures.

The subsequent explanations are valid for all embodiments:

A first coupling element 13 is movably assembled on a base 4 via a first suspension 11. A first drive 12 moves the first coupling element 13 with respect to the base. The first coupling element 13, the first suspension 11, the first drive 12 and, as the case may be, further elements such as transmission units form a first positioning unit 1.

A second coupling element 23 is movably assembled on the base 4 via a second suspension 21. A second drive 22 moves the second coupling element 23 with respect to the base 4. The second coupling element 23, the second suspension 21, the second drive 22 and, as the case may be, further elements such as transmission units form a second positioning unit 2.

The suspensions 11, 21 can be realised with spring leaves, thus with flat spring elements. Thereby, two bodies that are movable relative to one another are connected via two or more spring leaves as connection bodies. The spring leaves in each case at one end are fastened, for example, on the base 4, and with the other end, for example, on a coupling element 13, 23. A spring leaf is essentially flat and lies at least in sections in a plane. Movable sections of the different spring leaves of a suspension are equally long. The spring leaves are elastically bendable at least at locations. By way of this, they form joint locations or joint sections, in each case with the function of a rotatory joint. A spring leaf is typically manufactured of metal, but can also be manufactured of a plastic. It can also be manufactured as one piece with one of the bodies, to which it is connected. It can also be manufactured as one piece with other spring leaves. For this, an initially flat sheet-metal part can be formed and bent such that different sections of the sheet-metal part act as spring leaves. These different spring leaves can act in different suspensions and/or transmission units and thereby be assembled as a single component.

The different, applied drives are realised as piezoelectric drives. However, individual ones of these can also be replaced by other drive systems. The drives are constructed in the same manner and are hereinafter explained by way of a first drive 12: The drive 12 includes an active part or drive part or active element 121, and a passive part or passive element 122. The drive part 121 includes a flat resonator 123, for example of a sheet-metal piece, and one or more piezoelements 124. The piezoelement or piezoelements 124 are excited with an electrical voltage by way of a voltage producer (not shown). The oscillation of the resonator 123, which arises by way of this, produces intermittent contact forces at contact regions of the resonator, which at least temporarily come into contact with the passive part 122. One can select oscillation modes, with which the movement of the contact regions selectively drives the passive part 122 in the one or the other direction, by way of the selection of the excitation frequency. Further details regarding this type of drive can be deduced from WO 2006/000 118.

The drive is basically constructed as a linear drive. The movement of the passive part 122 is defined by the respective suspension and as a rule is a translatory or a rotatory movement with one degree of freedom. If the drive drives two bodies with respect to one another, then the active part 121 can be fastened on one a body, and the passive part 122 on the other body, or vice versa. For example, the active part 121 can be fastened on the base 4 and the passive part 122 on the respective coupling element, or vice versa. The passive part 122 can also be designed as part of the other body.

The regulation (closed-loop control) of the drives as a rule necessitates a position measurement for determining the linear position of the drive along its movement direction. For this, on the one hand magnets 15, 25 35 can be assembled on the moved parts and Hall sensors 16, 26, 36 arranged correspondingly thereto on the base, or vice versa.

A reference plane of the base 4 is hereinafter considered as being spanned by the directions X and Y. A Z-direction is normal to the X-Y plane spanned by the directions X and Y. An axis of the carrier 5, in a non-deflected condition or idle position or reference position of the carrier 5 is parallel to the Z-direction.

If the positioning direction is applied for optical picture stabilisation, then advantageously the X-Y plane is parallel to a plane, in which a picture sensor lies. The axis of the carrier 5 is advantageously equal to the optical axis of the lens system which is arranged in or on the carrier 5.

Possible dimensions for the positioning device of the different embodiments are, for example, a base surface of the base of 8.5 square mm to 12 square mm, in particular 11.5 square mm. The height of the positioning device is, for example, between 4 mm and 6 mm, depending on the thickness of the applied lenses also up to 7 mm or 8 mm.

Figure 1B:
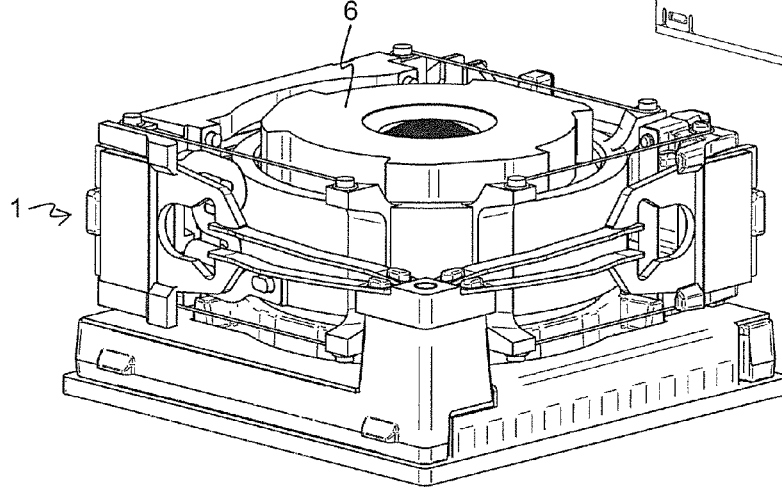

The individual embodiments are now dealt with hereinafter:

FIGS. 1a-1h show an embodiment with a carrier which is movable in three translatory directions, in different views. In FIG. 1a, the positioning device is covered with a housing 9 for the electromagnetic compatibility. Apart from the already described elements, what is visible in the following figures is:

The positioning device in a view from a first side is represented in FIG. 1b. A lens holder 6 with optical lenses is represented in a manner inserted into the carrier 5. An optical receiver 7 below the lenses or the carrier 5 is arranged on the base 4, but is not visible in this view. The lens holder 6 is no longer illustrated in the further figures. The lens holder 6 can be screwed with a thread in the carrier 5. The thread can be of the type M6 to M8.5. The lens holder 6 can then be positioned according to the actual focal width of the lens system, on assembly in the carrier 5. The type of the assembly of the lens holder described here can also be realised in the other embodiments.

Figure 1C:
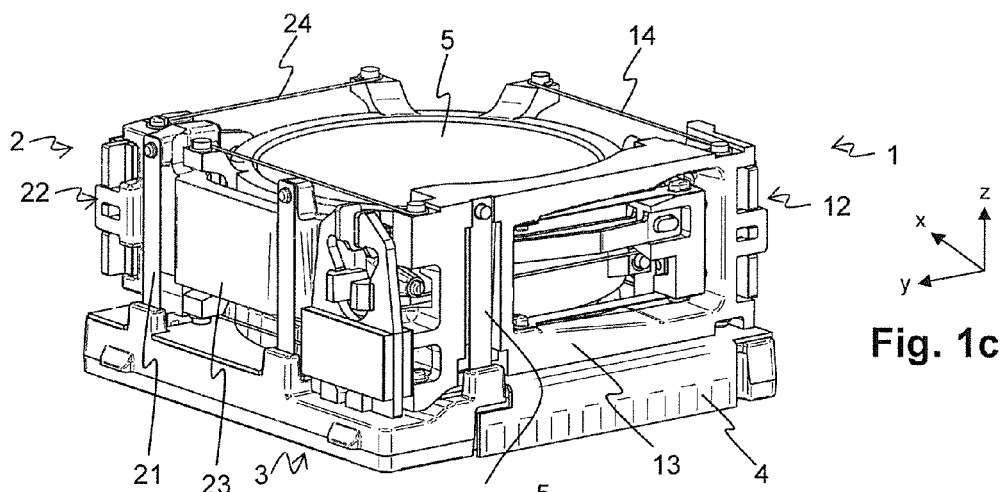
Figure 1D:
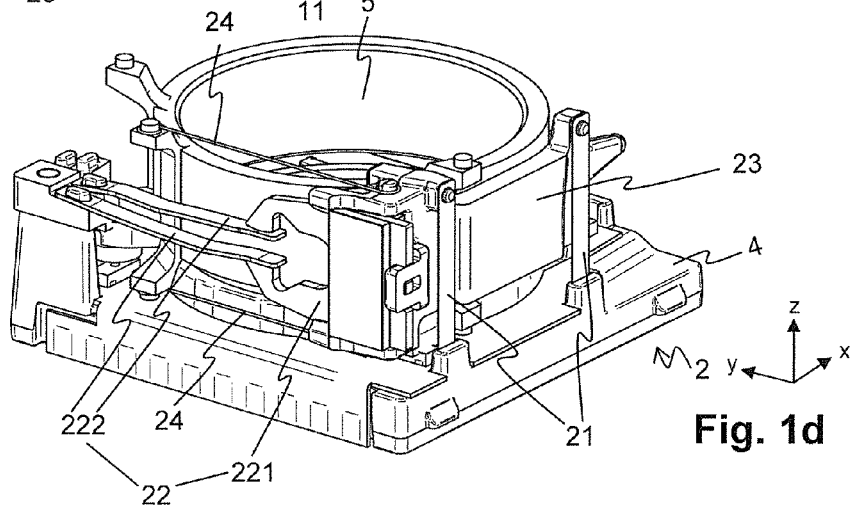

The positioning device is represented in a view from the opposite side in FIG. 1c. The lens holder 6 is no longer drawn in here and in the remaining figures of this embodiment The elements for the movement of the carrier 5 in the Y-direction are drawn in Figure d.

Figure 1E:
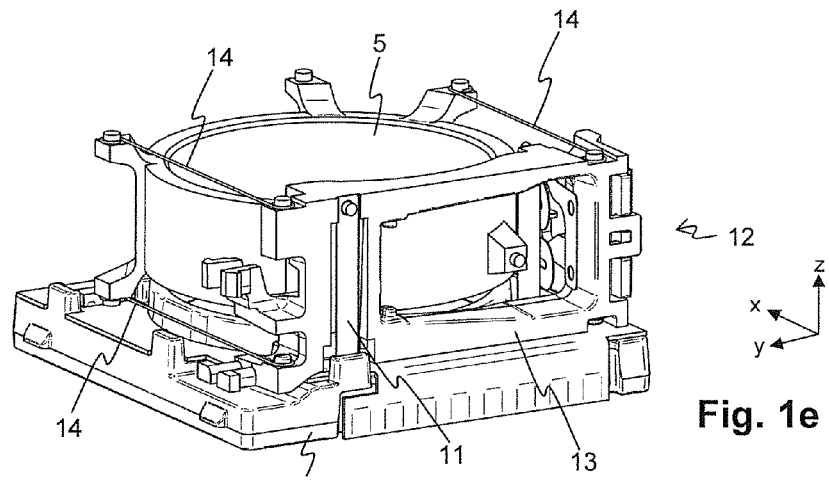
Figure 1F:
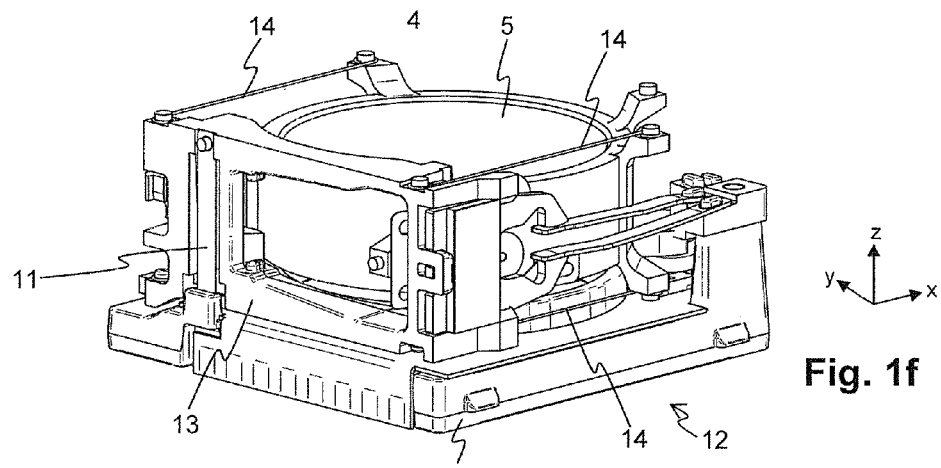

The elements for the movement of the carrier in the X-direction are drawn in the FIGS. 1e and 1f.

Figure 1G:
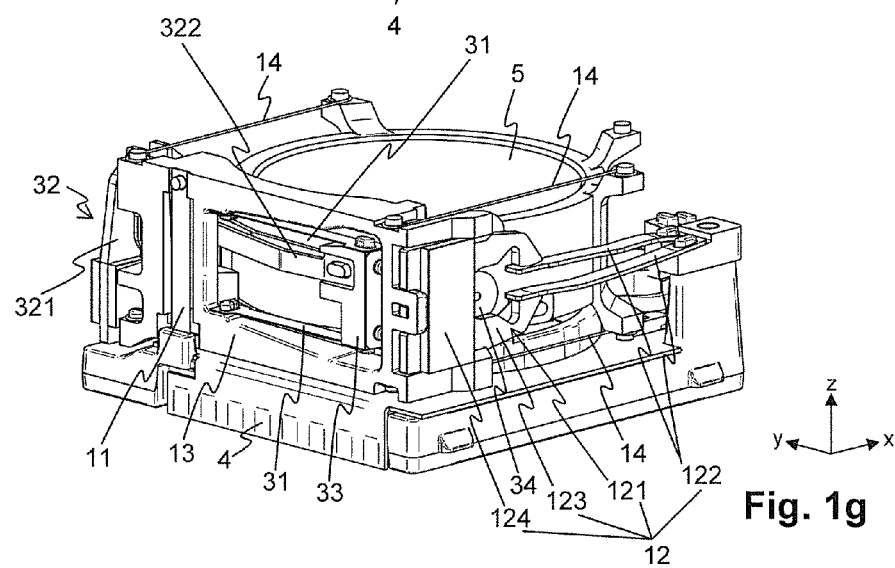

FIG. 1g corresponds to FIG. 1f, wherein additionally, the elements for the movement of the carrier 5 in the Z-direction are drawn in.

Figure 1H:
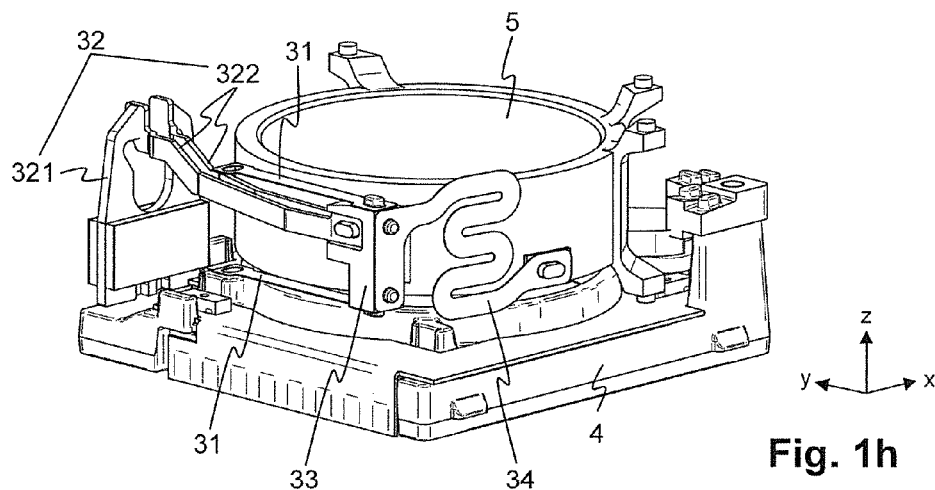

FIG. 1h corresponds to FIG. 1g, wherein only the elements for the movement of the carrier in the Z-direction are drawn, thus those for the X-direction are omitted.

Represented in FIGS. 1g and 1h: A third coupling element 33 is movably assembled on the first coupling element 12 via a third suspension 31. A third drive 32 moves the third coupling element 33 with respect to the first coupling element 13. The third drive 32 is therefore arranged on the first coupling element 12 and is co-moved with this. The third coupling element 33 is connected to the carrier 5 via a third transmission unit 34. The third coupling element 33, the third suspension 31, the third drive 32 and, as the case may be, further elements such as transmission units form a third positioning unit 3.

The spring leaves of the three suspensions 11, 21, 31 are in each case arranged parallel to one another (i.e. parallel with their respective planes) and thus each form a parallelogram suspension with exactly one translation degree of freedom.

The first coupling element 13 is connected to the carrier 5 via a first transmission unit 14. The second coupling element 23 is connected to the carrier 5 via a second transmission unit 24. The transmission units 14, 24 are realised by parallelogram suspensions with two translation degrees of freedom in each case. For this, at least three elongate connection bodies, for example wires or rods are arranged parallel to on another in each case. Movable sections of the different connection bodies of a transmission unit are equally long in each case. The connection bodies are elastically bendable at least at locations. They form joint locations or joint sections by way of this, with the function of a ball joint in each case. A connection body is typically manufactured of metal, but can also be manufactured of a plastic. It can also be manufactured as one piece with one of the bodies, to which it is connected.

The first coupling element 13 is movable in a first direction, hereinafter also called X-direction, with respect to the base 4. The second coupling element 23 is movable in a second direction, hereinafter also called Y-direction, with respect to the base 4. Both of these directions are not parallel to one another and are typically essentially orthogonal to one another. The third coupling element 33 is movable in a third direction with respect to the base 4 or with respect to the first coupling element 13, on which it is suspended. The third direction, hereinafter also called Z-direction, is not parallel to any of the other two directions, and is typically essentially orthogonal to the two other directions.

- The movement of the first coupling element 13 is limited to a translation in the X-direction. The carrier 5 by way of the first transmission unit 4, in the X-direction is coupled essentially rigidly to the movement of the first coupling element 13, but is movable with respect to the first coupling element 13 in the Y-direction and Z-direction.
- The movement of the second coupling element 23 is limited to a translation in the Y-direction. The carrier 5 by way of the second transmission unit 24, in the Y-direction is coupled essentially rigidly to the movement of the second coupling element 23, but is movable in the X-direction and Z-direction with respect to the second coupling element 23.
- The movement of the third coupling element 33 is limited to a translation in the Y-direction. The carrier 5, by way of the third transmission unit 34, in the Z-direction is coupled essentially rigidly to the movement of the third coupling element 33, but is movable in the Y-direction with respect to the second coupling element 23.

A relative movement between the third coupling element 33 and the first coupling element 13 in the X-direction does not take place, since the third coupling element 33 is co-moved with the first coupling element 13.

The third transmission unit 34 is realised here by a flat spring, which extends in the Z-direction from the third coupling element 33 to the carrier 5. The spring in the idle condition lies in a plane that lies normally to the Y-direction. The spring is not compliant in the Z-direction (thus with respect to a relative movement parallel to the plane), but it can be bent out of the plane in the Y-direction. The spring can be a straight leaf spring. If it has a meandering shape as shown here, then its compliance in the Y-direction is increased.

A second variant of the embodiment of the FIGS. 1*a*-1*h* is represented in the FIGS. 6*a*-6*d*. FIG. 6*a* shows all, FIG. 6*b* only the second, FIG. 6*c* only the first and FIG. 6*d* only the third of the three positioning units. Here the third coupling element 33 is movably assembled and driven with respect to the base 4, and the third transmission unit 34 permits a relative movement between the third coupling element 33 and the carrier 5 in the X-direction, as also in the Y-direction. The third transmission unit 34 in contrast is stiff in the Z-direction. It thus has essentially two translatory degrees of freedom. For example, the third transmission unit 34 can be realised in the same manner as the first transmission unit 14 for this. Alternatively, as is evident in FIGS. 6*d* and 7*a*, it can be realised by elements with meandering part elements which seen kinematically are arranged in parallel. In each case two such elements 34*a*, 34*b* are shown formed on a single part in the mentioned FIGS. 6*d* and 7*a*, but they can also be designed as separate parts.

Figure 8A:
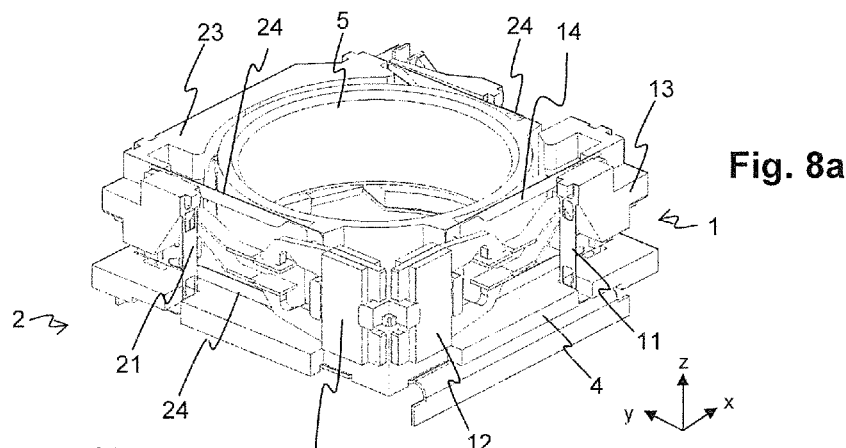
Figure 8B:
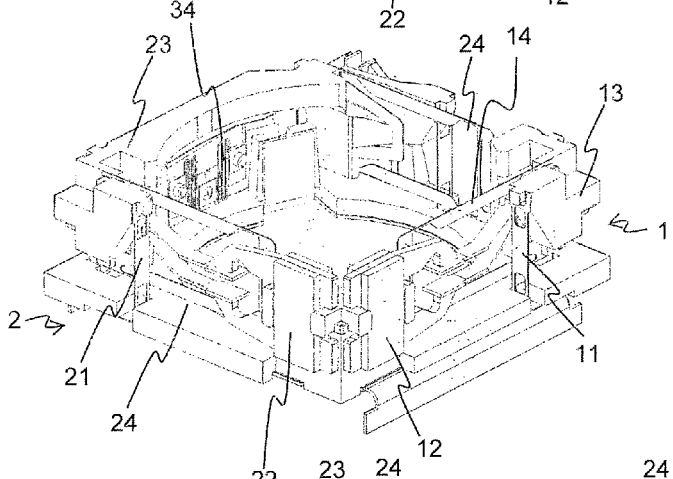
Figure 8C:
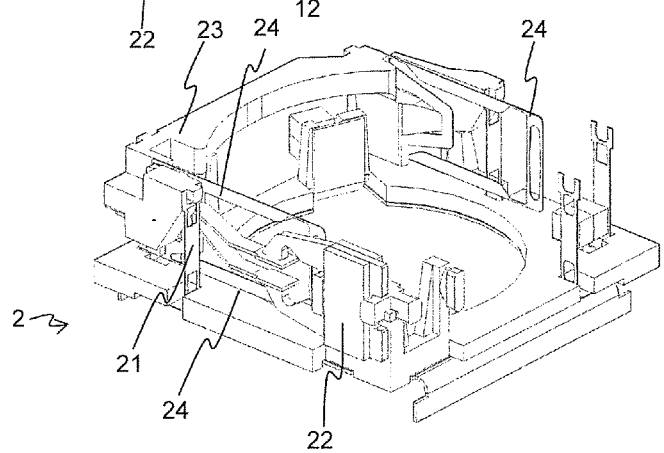

A third variant of the embodiment of the FIGS. 1*a*-1*h* is represented in the FIGS. 8*a*-8*e*. FIGS. 8*a* and 8*b* show all, FIG. 8*c* only the second and FIGS. 8*d* and 8*e* only the first and the third of the three positioning units. Here too—as in the variant of FIGS. 6*a*-6*d*—the third coupling element 33 is movably assembled and driven with respect to the base 4, and the third transmission unit 34 permits a relative movement between the third coupling element 33 and the carrier 5 in the X-direction as well as in the Y-direction. In contrast, the third transmission unit 34 is stiff in the Z-direction. It thus has essentially two translatory degrees of freedom. For this, the third transmission unit 34, for example, can be realised in the same manner as the first transmission unit 14. Alternatively, as is visible in the FIGS. 8*b*, 8*e* and 9, it can be realised by elements with part-elements that kinematically are arranged in parallel and are of a meandering shape. In each case two such elements 34*a*, 34*b* are shown formed on a single part in the mentioned FIGS. 8*b*, 8*e* and 9, but they can also be designed as separate parts.

For the second and third variant it is the case that: The position of the carrier 5 in the three translatory dimensions is unambiguously determined by way of the superposition of the kinematic connections of the carrier 5 via the three coupling elements 13, 23, 33 and transmission units 1, 24, 34. The position in each dimension can be set essentially independently via one of the three drives 12, 22, 32. Sensors, such as Hall sensors can optionally determine the position of the individual coupling elements, in particular of the third one, completely independently of the position of the other coupling elements.

The third variant is basically constructed analogously to the first two variants. It differs at least with regard to the following points:

- the first and the second transmission units 14, 24 are not realised by wires, but by bent sheet metal parts. Narrowings on these sheet parts functionally correspond to wires and thus to joints, with which the transmission units permit a rotation about two axes, and are thereby stiff with respect to a translation leading through rotation points of these joints,
- at least one of the passive elements 122, 222 is designed in the following manner: it includes two individual, elastically deformable spring elements that are commonly rotatably assembled about an axis. The rotation about the axis can be realised by a flexure hinge. Tolerances in the mutual position of the spring elements with respect to the active element are compensated by way of the two spring elements commonly rotating about this axis. The axis runs normally to the movement direction of the passive element.

The embodiment of FIGS. 1a-1h or 6a-6d or 8a-8e can alternatively also be realised without any movability in the Z-direction. In this case, the third coupling element 33 with the associated drive and transmission unit is done away with. The first transmission unit 14 and the second transmission unit 24 can then be realised by parallelogram suspensions in each case with only one instead of two translation degrees of freedom. The position of the carrier 5 in these two translatory dimensions is unambiguously determined by way of the superposition of the kinematic connections of the carrier 5 via the two coupling elements 12, 23 and transmission units 14, 24 in the X-direction and Y-direction. The position in both directions can be set essentially independently via one of the corresponding two drives 12, 22.

The passive elements 122, 222 of the two drives 12, 22 in each case extend along a first and a second side of the positioning device essentially in the X-direction or Y-direction and at a first end are fastened on the base 4 and at a second end, which is away from the first end, are in contact with the first and second active element 121, 221 respectively. The active elements 121, 221 of the two drives 12, 22 are fastened on the respective coupling point 13, 23 and are co-moved with this.

These can be fastened at the respective first ends of the passive elements as follows: a passive element includes two individual, elastically deformable spring elements or spring leaves. In the non-loaded condition, each of the spring leaves is flat, thus runs in a plane. A fastening location of the first spring and a fastening location of the second spring are aligned obliquely to one another, so that the spring leaves are spread away from one another in the non-loaded condition. If in the assembled condition of the drive, the active element embraces (encompasses) the spring leaves, then it thus presses these together with a bias. The drive with this also has a holding force in the non-supplied condition.

Figure 2A:
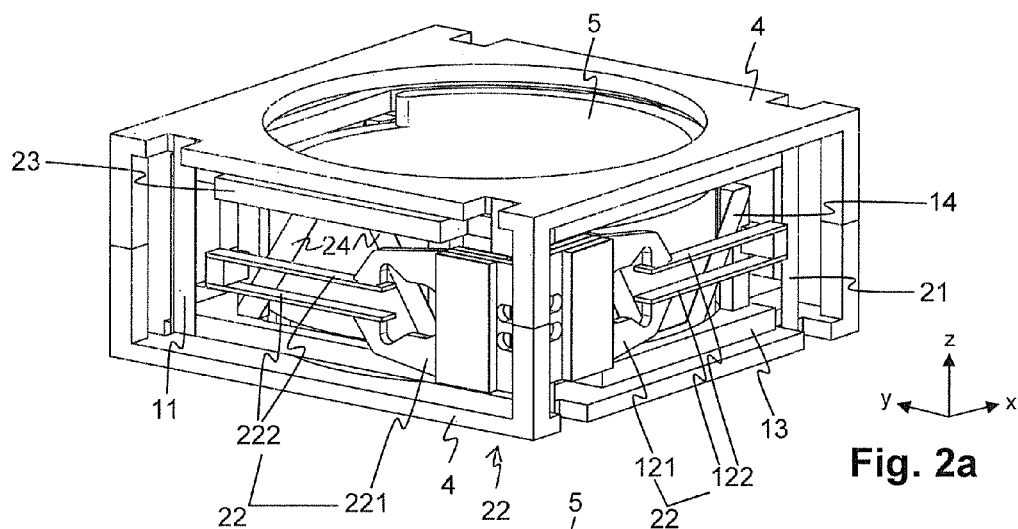
FIGS. 2a-2c an embodiment with a carrier movable in two translatory directions.
Figure 2B:
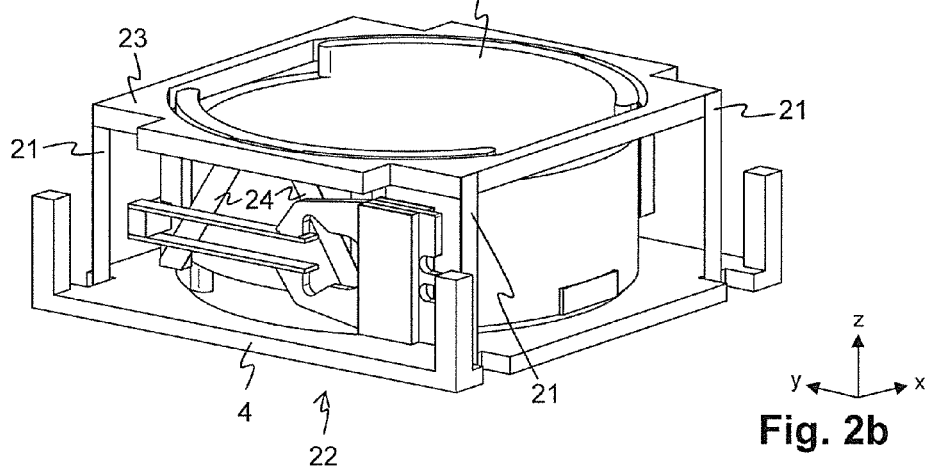
Figure 2C:
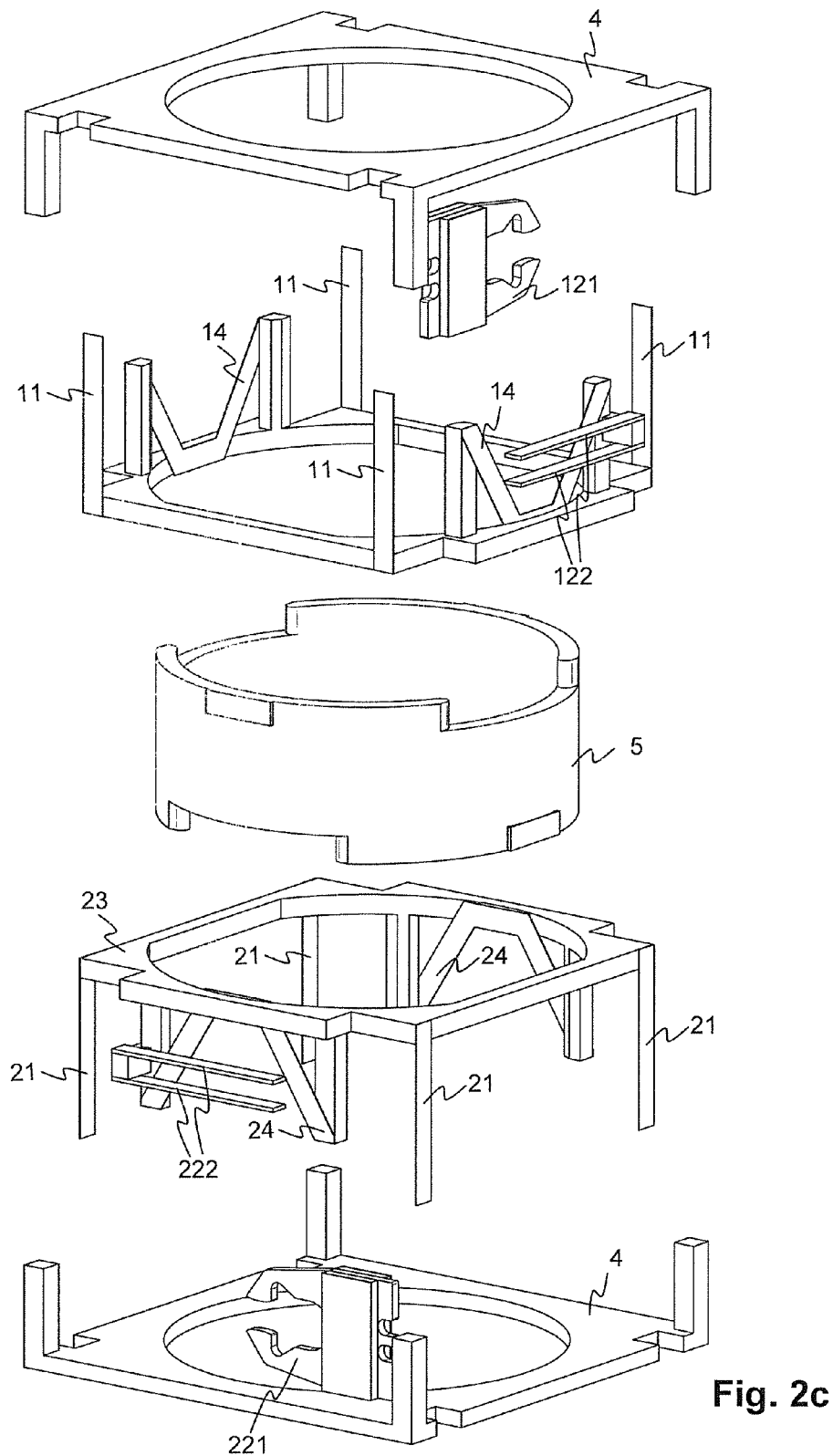
Figure 3A:
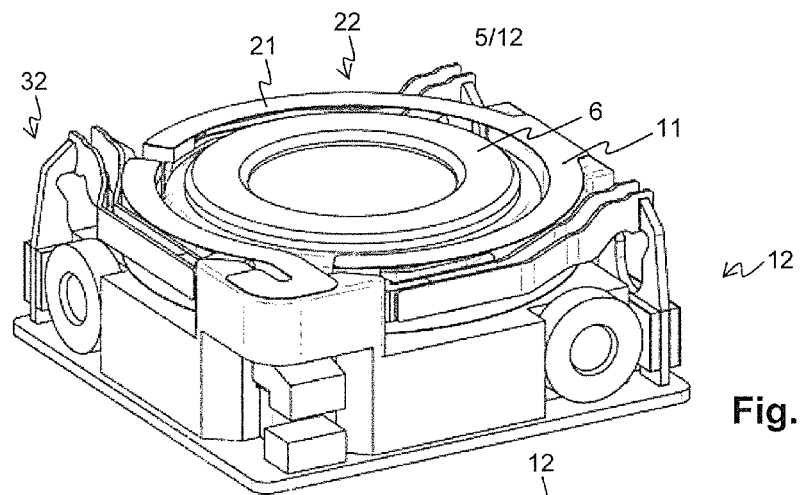
Figure 3B:
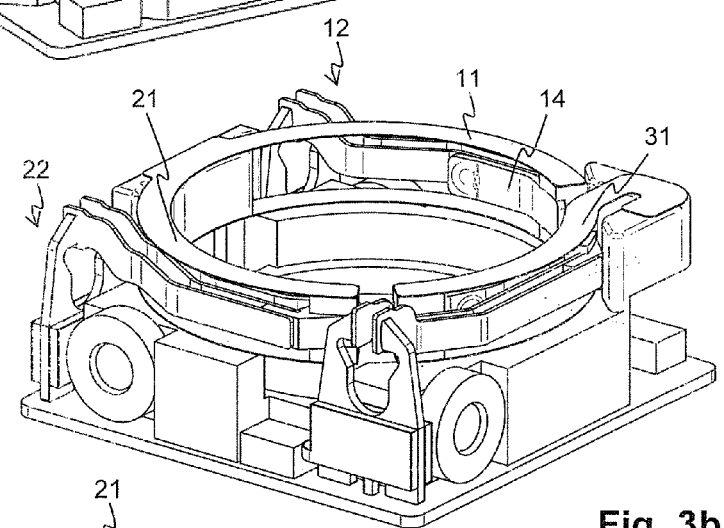
Figure 3C:
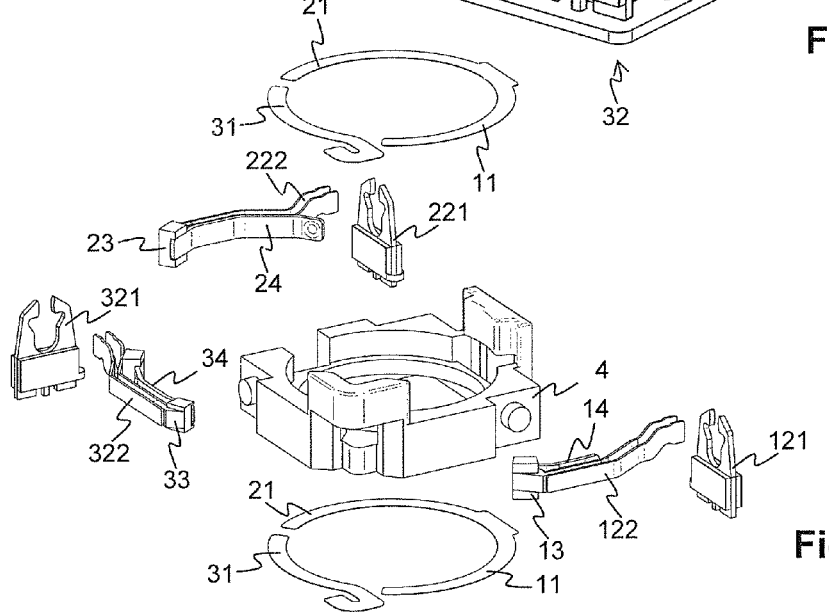

FIGS. 2a-2c show an embodiment with a carrier, which is movable in two translatory directions. Here, apart from the already described elements are present:

The spring leaves of the two suspension 11, 21 in each case are arranged parallel to one another (i.e. parallel with their respective planes) and, thus, in each case form a parallelogram suspension with exactly one translation degree of freedom. In each case, a pair of spring leaves, which lie in the same plane, does not run parallel to one another within this plane. They move with one another and thereby remain essentially in the same plane.

The first coupling element 13 is movable with respect to the base 4 in a first direction, hereinafter also called X-direction. The second coupling element 23 is movable with respect to the base 4 in a second direction, hereinafter also called Y-direction. These two directions are not parallel and are typically essentially orthogonal to one another.

The movement of the first coupling element 13 is limited to a translation in the X-direction. The carrier 5 by way of the first transmission unit 14, in the X-direction is coupled essentially rigidly to the movement of the first coupling element, but is movable with respect to the first coupling element 13 in the Y-direction.

The movement of the second coupling element 23 is limited to a translation in the Y-direction. The carrier 5, by way of the second transmission unit 24, in the Y-direction is coupled essentially rigidly to the movement of the second coupling element 23, but is movable with respect to the second coupling element 23 in the X-direction.

The position of the carrier 5 is unambiguously determined in two translatory dimensions by way of the superposition of the kinematic connections of the carrier 5 via the coupling elements 13, 23 and transmission units 14, 24. The position in each dimension can be set essentially independently via one of the two drives 12, 22.

A space-saving configuration is realised as follows: The complete positioning device extends from an upper region to a lower region. With a picture stabiliser, for example a picture sensor lies on the base 4 and in the lower region, and adjustable optics lie on the carrier 5 with the entry of light in the upper region.

The first coupling element 13 is arrange in the lower region, wherein the first suspension 11 extends from the upper region to the lower region, is fastened in the upper region on the base 4 and is fastened in the lower region on the first coupling element 13. The first coupling element 13 at least in sections embraces the carrier 5 in the lower region.

The first coupling element 13 includes sections that reach into the upper region, and the first transmission unit 14 is fastened in the upper region on these sections of the first coupling element 13, and in the lower region on the carrier 5. Alternatively (not drawn) the first transmission unit 14 can be fastened in the lower region on the first coupling element 13 and in the upper region on the carrier 5. One can then make do without the mentioned sections of the first transmission unit 14.

The second coupling element 23 is arranged in the upper region, wherein the second suspension 21 extends from the lower region to the upper region, is fastened in the lower region on the base 4 and in the upper region on the second coupling element 23. The second coupling element 23 embraces the carrier 5 in the upper region at least in sections.

The second coupling element includes sections that reach into the lower region, and the second transmission unit 24 in the lower region is fastened on these sections of the second coupling element 23 and in the upper region on the carrier 5. Alternatively (not drawn), the second transmission unit 24 in the upper region can be fastened on the second coupling element 23 and in the lower region on the carrier. One can then make do without the mentioned sections of the second transmission unit 24.

The first suspension 11 is formed by four spring leaves, wherein planes, in which the spring leaves run, lie essentially parallel to one another or coincide. The second suspension 21 is formed by four spring leaves, wherein planes, in which the spring leaves run, lie essentially parallel to one another or coincide. In the idle condition, planes in which the spring leaves of the first suspension 11 run, run normally to planes in which the spring leaves of the second suspension 21 run. The same analogously applies to the first transmission unit 14 and the second transmission unit 24.

The passive elements 122, 222 of the two drives 12, 22 are not drawn in the figure regarding this embodiment. They, in each case, extend along a first and a second side of the positioning device essentially in the X-direction or Y-direction and are fastened at a first end on the first coupling element 13 and second coupling element 23, respectively, and at a second end, which is away from the first end are in contact with the first and second active element 121, 221, respectively. The active elements 121, 221 of the two drives 12, 22 are fastened on the base 4.

FIG. 3a-3e show an embodiment with a carrier that is rotatable about two rotation axes and movable in a translatory direction. Here, apart from the already described elements, there are present:

Additionally, a third coupling element 33 is movably assembled on a base 4 via a third suspension 31. A third drive 32 moves the third coupling element 33 with respect to the base 4.

The spring leaves of the three suspensions 11, 21, 31 are in each case arranged parallel to one another (i.e. parallel with their respective planes) and, thus, in each case form a parallelogram suspension with exactly one translation degree of freedom.

All three coupling elements 13, 23, 33 are movable parallel to the Z-axis.

The movement of each of the three coupling elements 13, 23, 33 is thus limited to a translation in the Z-direction. The carrier 5 at three points of its periphery is coupled to the movement of one of the coupling elements 13, 23, 33 in an essentially rigid manner with respect to the Z-direction, by way of a first, second and third transmission unit 14, 24, 34 in each case. The transmission units 14, 24, 34 permit at least small movements in the radial direction, thus in the X-Y plane. They are, thus, compliant in this plane and rigid in the direction normal thereto.

The position of the carrier 5 in two rotatory dimensions (rotation about the X-axis and Y-axis) and a translatory dimension (Z-direction) is determined unambiguously by way of the superposition of the kinematic connections of the carrier 5 via the three coupling elements 13, 23, 33 and transmission units 14, 24, 34. The orientation or the position in these three dimensions can be set by way of a combined activation of the three drives 12, 22, 32. If only two drives are present or only two drives are moved, then with this the orientation of the carrier 5 in the mentioned two rotatory dimensions can be set.

The spring leaves of the three suspensions 11, 21, 31 are each arranged around the carrier 5, following a section of a circle. The respective circle lies in a plane parallel to the plane of the spring leaves. The three transmission units 14, 24, 34 are likewise each arranged around the carrier 5 in a manner following a circle section. They permit a small movement of contact locations to the carrier 5 in the X-Y plane, for the compensation of movements which arise by way of the rotation of the carrier 5 out of the X-Y plane. The contact locations between transmission units 14, 24, 34 and the carrier 5 realise ball joints. They are formed, for example, by ball calottes on the carrier 5 and correspondingly formed ball shells on the transmission units 14, 24, 34.

A spring leaf of the first and a, for example, coplanar spring leaf of the second suspension 11, 21 are manufactured of one piece, which simplifies the manufacture and assembly.

The passive elements 122, 222, 322 of the three drives 12, 22, 32 in each case extend along a first, a second and a third side of the positioning device, essentially in the X-direction or Y-direction, and are fastened at a first end on the respective coupling element 13, 23, 33 and at a second end which is away from the first end are in contact with the respective active elements 121, 221, 322. The active elements 121, 221 of the two drives 12, 22 are fastened on the base 4.

Figure 4:
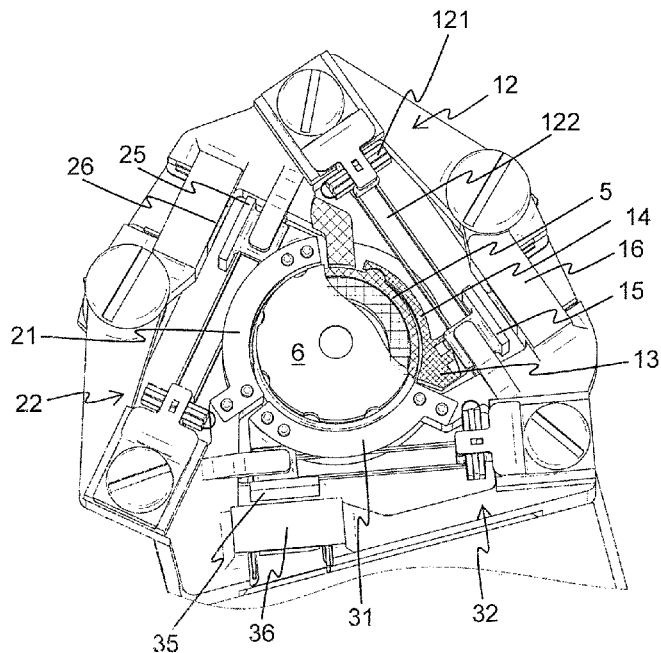
FIG. 4 a further embodiment with a carrier that is rotatable about two rotation axes and is movable in one translatory direction.

FIG. 4 shows a further embodiment with a carrier, which is rotatable about two rotation axes and movable in one translatory direction.

The kinematic conditions are the same as with the preceding embodiment. The three coupling elements 13, 23, 33, their drives 12, 22, 32 and transmission units 14, 24, 34 are essentially arranged in a rotationally symmetrical manner about the carrier 5. The spring leaves of the three suspensions 11, 12, 13 each follow a section of a circle 5 around the carrier 5 with the lens holder 6. The three suspensions 11, 21, 31 each include two spring leaves that are arranged in parallel. The three coupling elements 13, 23, 33 each carry a transmission unit 14, 24, 34, which is designed in the same manner as with the FIGS. 3a-3e and are coupled onto the carrier 5.

FIGS. 5a-5d show an embodiment with a carrier, which can be rotated about two rotation axes. Present here, apart from the already described elements, are:

The spring leaves of the two suspensions 11, 21 in each case are not arranged parallel to one another (i.e. not parallel with their respective planes) and thus form a four-bar linkage with exactly one degree of freedom. If the spring leaves of a suspension 11, 21 at least approximately form a triangle together with one of the two bodies participating in the suspension, as is the case with this embodiment, then the relative movement of the suspension is essentially a rotation movement. A rotation axis of this rotation movement lies in the region of the corner of the triangle, in which region the two spring leaves at least approximately meet.

The first coupling element 13 is rotatable with respect to the base 14 about a first axis, here for example the X-axis of a coordinate system. The second coupling element 23 is rotatable with respect to the base 4 about a second axis, here for example a Y-axis. The two axes are not parallel to one another and are typically essentially orthogonal to one another.

The movement of the first coupling element 13 is limited to a rotation about the X-axis. The carrier 5 by way of the first transmission unit 14 is essentially rigidly coupled to the movement of the first coupling element 13 with respect to this rotation, but is rotatable about the Y-axis with respect to the first coupling element 13.

The movement of the second coupling element 23 is limited to a rotation about the Y-axis. The carrier 5 by way of the second transmission unit 24, with respect to this rotation is coupled essentially rigidly to the movement of the second coupling element, but is rotatable about the X-axis with respect to the second coupling element 23.

The position of the carrier 5 in two rotatory dimensions is unambiguously determined by the superposition of the kinematic connections of the carrier 5 via the two coupling elements 13, 23 and transmission units 14, 24. The position in each dimension, thus the rotation with respect to the X-axis and Y-axis can be set essentially independently via one of the two drives 12, 22.

The two transmission units 14, 24 here are not necessarily formed by separate parts, but are realised by the design of the shape of the carrier 5 and of the coupling elements 13, 23. The first transmission unit 14 and the carrier 5 are shaped corresponding to one another and form a guide which transmits the rotation about the X-axis from the first transmission unit 14 onto the carrier 5, but permits a rotation of the carrier 5 about the Y-axis.

For example, for this, a first rotatory joint 141 is present between the first transmission unit 14 and the carrier 5, and is with a rotation axis parallel to the Y-axis.

Analogously, a second rotatory joint 241 is present between the second transmission unit 24 and the carrier 5, and is with a rotation axis parallel to the X-axis.

A simple kinematic is achieved, if the rotation axis of the first suspension 11 (here the X-axis) coincides essentially with the rotation axis of the second rotatory joint 241 or is at least parallel to this, and/or if the rotation axis of the second suspension 21 (here the Y-axis) essentially coincides with the rotation axis of the first rotatory joint 141 or is at least parallel to this.

This coinciding is then exact or has a minimal deviation, if the carrier 5 with respect to the base 4 is in the non-deflected condition or in the reference position.

if, departing from this reference position, for example the carrier 5 is rotated about the X-axis by a first angle, then the axis of the first rotatory joint 141 is also rotated about this first angle with respect to the Y-axis conversely, it is thus also the case that if the carrier 5 is rotated about the Y-axis by a second angle, the axis of the second rotatory joint 141 with respect to the X-axis is also rotated about this second angle.

With this, a weak mutual coupling of rotation movement results, which can either be neglected, or can be compensated by way of the control of the drives.

A space-saving configuration is realised as follows: the complete positioning device extends from an upper region to a lower region. With a picture stabiliser, for example, a picture sensor lies on the base 4 and in the lower region, and adjustable optics on the carrier 5, with the entry of light in the upper region.

The first coupling element 13 is rotatable about a first rotation axis in the lower region, wherein the first suspension 11 extends from the lower region up to the upper region. The first coupling element 13 embraces the carrier 5 in the upper region at least in sections, and carries the first transmission unit 14 or the first rotatory joint 141 in the upper region.

The second coupling element 23 is rotatable about a rotation axis in the upper region, wherein the second suspension 21 extends from the upper region to the lower region. The second coupling element 23 embraces the carrier 5 in the lower region at least in sections and carries the second transmission unit 24 or the second rotatory joint 241 in the lower region.

The two rotation axes for the rotation (of the first suspension 11 and of the carrier 5) about the X-axis are thus located in the lower region.

The two rotation axes for the rotation (of the second suspension 21 and the carrier 5) about the Y-axis are located in the upper region.

The passive element 122 of the first drive 12 extends between the lower and upper region along a first side of the positioning device from a fastening location on the first coupling element 13 to the active element 121 of the first drive 12.

The passive element 222 of the second drive 22 extends between the lower and the upper region along a second side of the positioning device, which is different from the first side, from a fastening location on the second coupling element 23 to the active element 221 of the second drive 22.

The active elements 121, 221 of the two drives 12, 22 are fastened on the base 4.

Figure 7A:
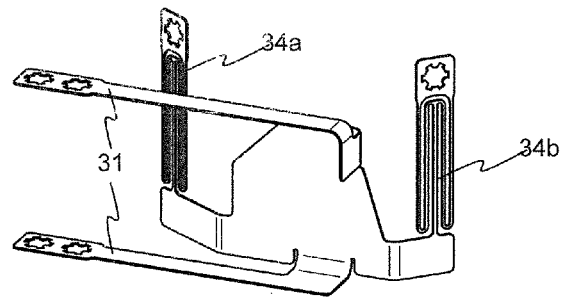
Figure 7B:
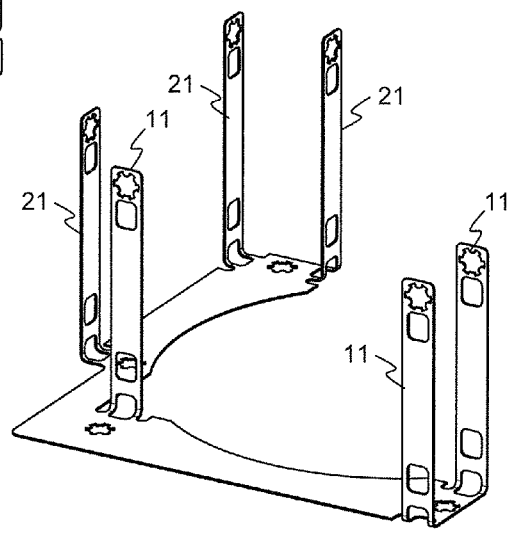
Figure 5D:
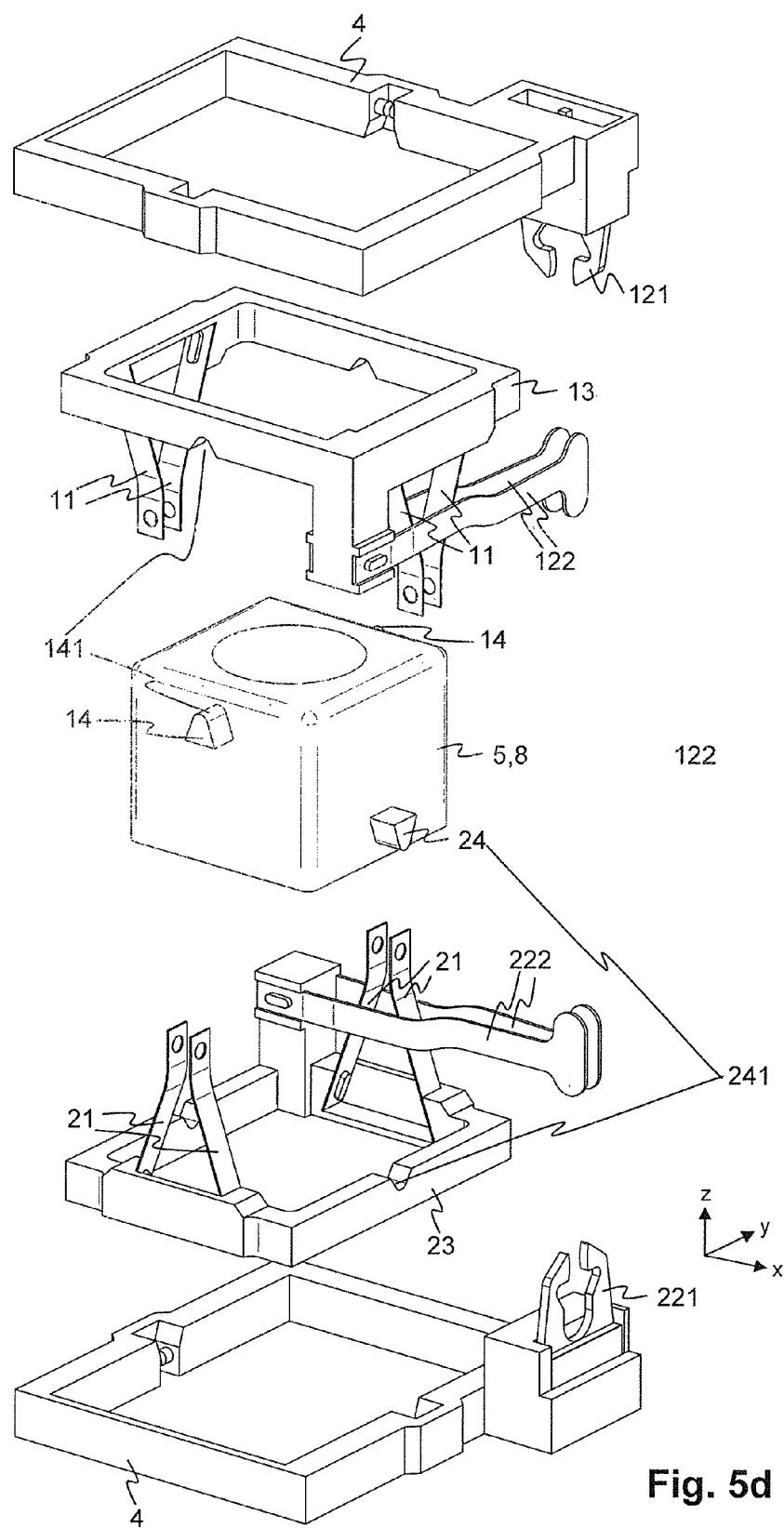

FIGS. 7*a*-7*c* in each case show several spring elements, which are designed as sections of a single-piece part, in particular of a plate or sheet part. The spring elements here are spring leaves. A single-piece part, which can be part of the embodiment of FIGS. 6*a*-6*d*, is shown in FIG. 7*a*. Two spring leaves of the third suspension 31 as well as spring elements of the third transmission unit 34 are formed on this part. A single-piece part, which can be part of the embodiment of FIGS. 1*a*-1*h* or 6*a*-6*d*, is shown in FIG. 7*b*. Three spring leaves of the first suspension 11 as well as three spring leaves of the second suspension 21 are formed on this part. A single-piece part, which can be part of the embodiment of FIGS. 8*a*-8*e*, is shown in FIG. 7*c*. Two spring leaves of the first suspension 11 as well as four spring leaves of the second suspension 21 are formed on this part.

A single-piece part, which can be part of the embodiment of FIGS. 8*a*-8*e*, is shown in FIG. 9. Two spring elements 34*a*, 34*b* of the third transmission unit 34 are formed on this part.

The invention claimed is:

1. A positioning device for a picture stabilizer for the controlled movement of a carrier with respect to a base, comprising
    a first coupling element which by way of a first suspension is assembled in a movable manner with respect to the base and is movable by a first drive,
    a second coupling element which by way of a second suspension is assembled in a movable manner with respect to the base and is movable by a second drive,
    a first transmission unit, with which a movement of the first coupling element can be transmitted onto the carrier,
    a second transmission unit, with which a movement of the second coupling element can be transmitted onto the carrier,
    wherein the first drive and the second drive are linear drives and the first coupling element and the second coupling element in each case have a movability with essentially exactly one translatory degree of freedom.

2. The positioning device according to claim 1, wherein at least the first suspension and/or the second suspension are realized by a suspension with at least two flat spring elements which connect the respective coupling element to the base.

3. The positioning device according to claim 1, wherein at least the first drive and the second drive are piezoelectric linear drives with which a flat resonator extends in the manner of a tuning fork with two arms parallel to a plane of an active element, the resonator can be set into oscillation by an electrically supplied piezoelement, wherein contact regions of the resonator, by way of an oscillating movement drive a passive element of the drive with respect to the active element.

4. The positioning device according to claim 1, wherein the first suspension permits a parallel displacement of the first coupling element with respect to the base, and the second suspension permits a parallel displacement of the second coupling element with respect to the base.

5. The positioning device according to claim 4, wherein one or more of the parallel displacements are realized in each case with a parallelogram suspension.

6. The positioning device according to claim 5, wherein at least the first suspension and/or the second suspension are realized by a parallelogram suspension with at least two flat spring elements that are arranged parallel to one another and connect the respective coupling element to the base.

7. The positioning device according to claim 5, wherein
    the parallel displacement of the first coupling element with respect to the base has exactly one translation degree of freedom, and
    the parallel displacement of the second coupling element with respect to the base has exactly one translation degree of freedom.

8. The positioning device according to claim 1, wherein the first transmission unit permits a parallel displacement of the carrier with respect to the first coupling element, and
the second transmission unit permits a parallel displacement of the carrier with respect to the second coupling element.

9. The positioning device according to claim 8, wherein the parallel displacement of the carrier with respect to the first coupling element has exactly two translation degrees of freedom, and
the parallel displacement of the carrier with respect to the second coupling element has exactly two translation degrees of freedom.

10. The positioning device according to claim 8, wherein the parallel displacement of the carrier with respect to the first coupling element has exactly one translation degree of freedom, and
the parallel displacement of the carrier with respect to the second coupling element has exactly one translation degree of freedom.

11. The positioning device according to claim 1, comprising a third coupling element which by way of a third suspension is assembled in a movable manner with respect to the first coupling element and is movable by a third drive,
a third transmission unit, with which a movement of the third coupling element can be transmitted onto the carrier.

12. The positioning device according to claim 1, wherein, if the carrier is arranged above the base, the first coupling element and the second coupling element are arranged laterally of the carrier.

13. The positioning device according to claim 1, wherein, if the carrier is arranged above the base, the first coupling element at least in sections embraces the carrier and is arranged in a lower region of the carrier, and the second coupling element at least in sections embraces the carrier and is arranged in an upper region of the carrier.

14. The positioning device according to claim 1, comprising
a third coupling element which by way of a third suspension is assembled in a movable manner with respect to the base and is movable by a third drive,
a third transmission unit, with which a movement of the third coupling element can be transmitted onto the carrier,
wherein each of the three transmission units engages on a different contact location on a periphery of the carrier, and all three transmission units effect an essentially translatory movement of the respective contact location.

15. The positioning device according to claim 1, wherein the first suspension permits a rotation of the first coupling element with respect to the base, and
the second suspension permits a rotation of the second coupling element with respect to the base.

16. The positioning device according to claim 15, wherein the first transmission unit permits a rotation of the carrier with respect to the first coupling element, and
the second transmission unit permits a rotation of the carrier with respect to the second coupling element.

17. The positioning device according to claim 15, wherein in a reference position of the carrier
a rotation axis of the first suspension runs parallel to a rotation axis of the second transmission unit or coincides with this, and
a rotation axis of the second suspension runs parallel to a rotation axis of the first transmission unit and coincides with this.

18. The positioning device according to claim 1, with which several resilient elements of one of the suspensions are designed in a single-piece manner as sections of an initially flat part.

19. The positioning device according to claim 1, with which several resilient elements of different ones of suspensions are designed in a single-piece manner as sections of an initially flat part.

20. The positioning device according to claim 1, with which several resilient elements of at least one of the suspensions and of at least one of the transmission units are designed in a single-piece manner as sections of an initially flat part.

21. A picture stabilizer with a positioning device according to claim 1.

* * * * *